(12) United States Patent
Lincoln

(10) Patent No.: US 9,907,299 B2
(45) Date of Patent: Mar. 6, 2018

(54) CATAPULT SYSTEM

(71) Applicant: Frank Lincoln, Glen Burnie, MD (US)

(72) Inventor: Frank Lincoln, Glen Burnie, MD (US)

( * ) Notice: Subject to any disclaimer, the term of this patent is extended or adjusted under 35 U.S.C. 154(b) by 237 days.

(21) Appl. No.: 14/882,707

(22) Filed: Oct. 14, 2015

(65) Prior Publication Data

US 2017/0105398 A1   Apr. 20, 2017

(51) Int. Cl.
*A01K 91/02* (2006.01)
*A01K 87/00* (2006.01)

(52) U.S. Cl.
CPC ............ *A01K 91/02* (2013.01); *A01K 87/007* (2013.01)

(58) Field of Classification Search
CPC ........ A01K 91/02; A01K 91/00; A01K 87/04; A01K 87/007
See application file for complete search history.

(56) References Cited

U.S. PATENT DOCUMENTS

| | | | |
|---|---|---|---|
| 2,089,744 A | 8/1937 | Golden | |
| 2,485,144 A * | 10/1949 | Espenship | A01K 87/08 279/48 |
| 2,773,494 A * | 12/1956 | Thompson | A01K 91/02 124/38 |
| 2,873,547 A | 2/1959 | Coelho | |
| 2,958,975 A * | 11/1960 | Neff | A01K 87/00 43/19 |
| 3,026,644 A * | 3/1962 | Raider | A01K 91/02 124/26 |
| 3,261,123 A * | 7/1966 | Gugliotta | A01K 91/02 43/19 |
| 3,266,184 A | 8/1966 | Brown | |
| 3,344,547 A | 10/1967 | Schroeder et al. | |
| 3,352,050 A * | 11/1967 | Mowrey | A01K 91/02 43/41.2 |
| 3,365,834 A | 1/1968 | Kreft | |
| 4,501,085 A * | 2/1985 | Barnes | A01K 91/02 124/74 |
| 4,682,437 A * | 7/1987 | Akerberg | A01K 91/02 43/19 |
| 5,421,116 A * | 6/1995 | Moon | A01K 91/02 43/19 |
| 5,491,924 A | 2/1996 | Athanasiadis | |
| D377,204 S | 1/1997 | Athanasiadis | |
| 5,735,074 A | 4/1998 | Stauffer | |
| 6,497,066 B1 * | 12/2002 | Harrison | A01K 91/02 124/76 |
| 7,698,851 B1 * | 4/2010 | Donohoe | A01K 91/02 43/19 |
| 8,276,309 B2 | 10/2012 | Al-Mutairi | |
| 8,393,111 B1 * | 3/2013 | Johnson | A01K 97/08 211/70.8 |

(Continued)

FOREIGN PATENT DOCUMENTS

FR      2129140 A5 * 10/1972  ............. A01K 91/02
JP       50017386 U *  2/1975

*Primary Examiner* — Christopher P Ellis
*Assistant Examiner* — Magdalena Topolski

(57) ABSTRACT

A catapult system for casting a lure from a fishing pole includes a fishing rod that has a line and a reel. The line has a lure that is coupled thereto such that the lure may be cast outwardly from the fishing rod. A catapult is removably coupled to the fishing rod. The catapult engages the lure such that the catapult selectively casts the lure outwardly from the fishing rod.

12 Claims, 4 Drawing Sheets

(56) References Cited

U.S. PATENT DOCUMENTS

| | | | |
|---|---|---|---|
| 8,499,486 B1* | 8/2013 | Thomsen | A01K 91/02 43/19 |
| 8,590,204 B1 | 11/2013 | Al-Mutairi | |
| 2011/0283594 A1* | 11/2011 | Boy | A01K 91/02 43/25 |
| 2015/0223438 A1* | 8/2015 | Tschantz | A01K 91/06 43/44.88 |
| 2017/0086437 A1* | 3/2017 | Essafi | A01K 91/02 |

* cited by examiner

CATAPULT SYSTEM

BACKGROUND OF THE DISCLOSURE

Field of the Disclosure

The disclosure relates to catapult devices and more particularly pertains to a new catapult device for casting a lure from a fishing pole.

SUMMARY OF THE DISCLOSURE

An embodiment of the disclosure meets the needs presented above by generally comprising a fishing rod that has a line and a reel. The line has a lure that is coupled thereto such that the lure may be cast outwardly from the fishing rod. A catapult is removably coupled to the fishing rod. The catapult engages the lure such that the catapult selectively casts the lure outwardly from the fishing rod.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
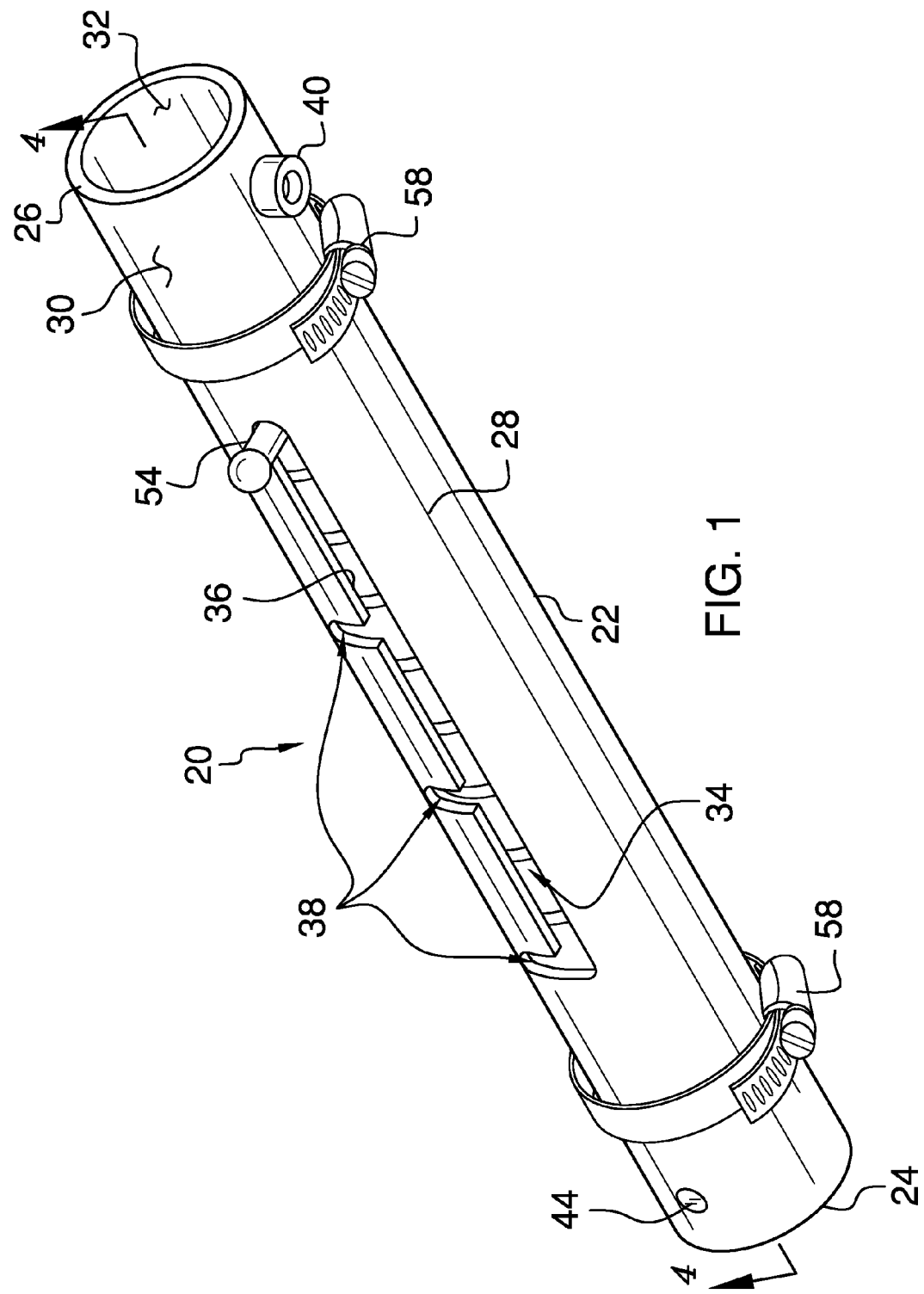
FIG. 1 is a perspective view of a catapult system according to an embodiment of the disclosure.
Figure 2:
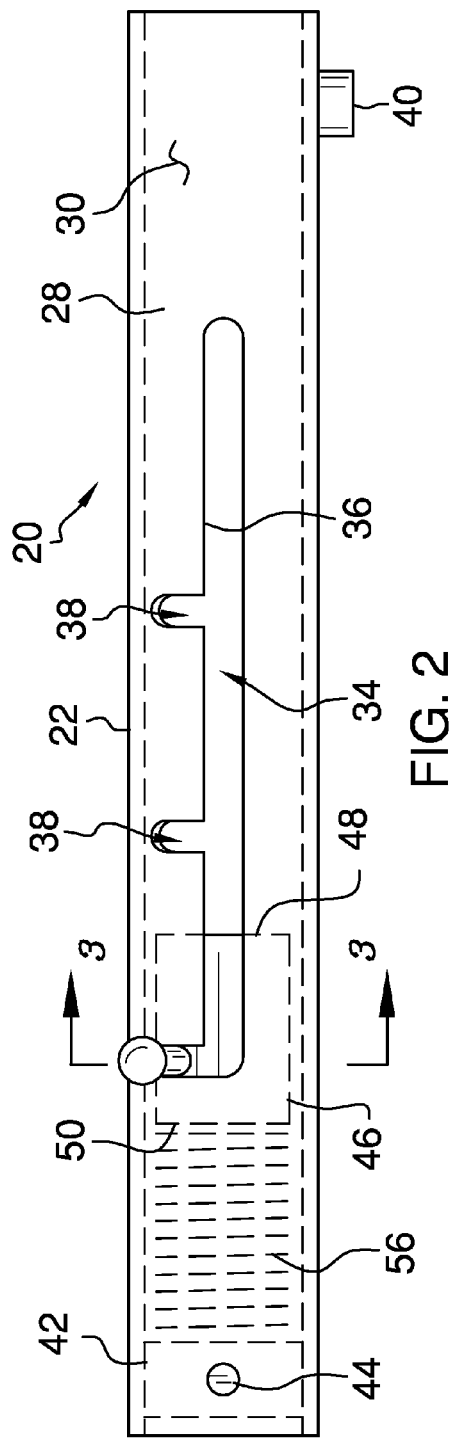
FIG. 2 is a right side view of an embodiment of the disclosure.
Figure 3:
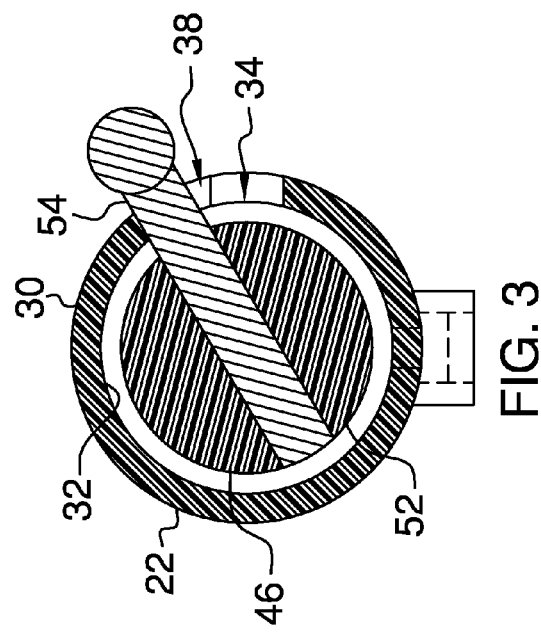
FIG. 3 is a cross sectional view taken along line 3-3 of FIG. 2 of an embodiment of the disclosure.
Figure 4:
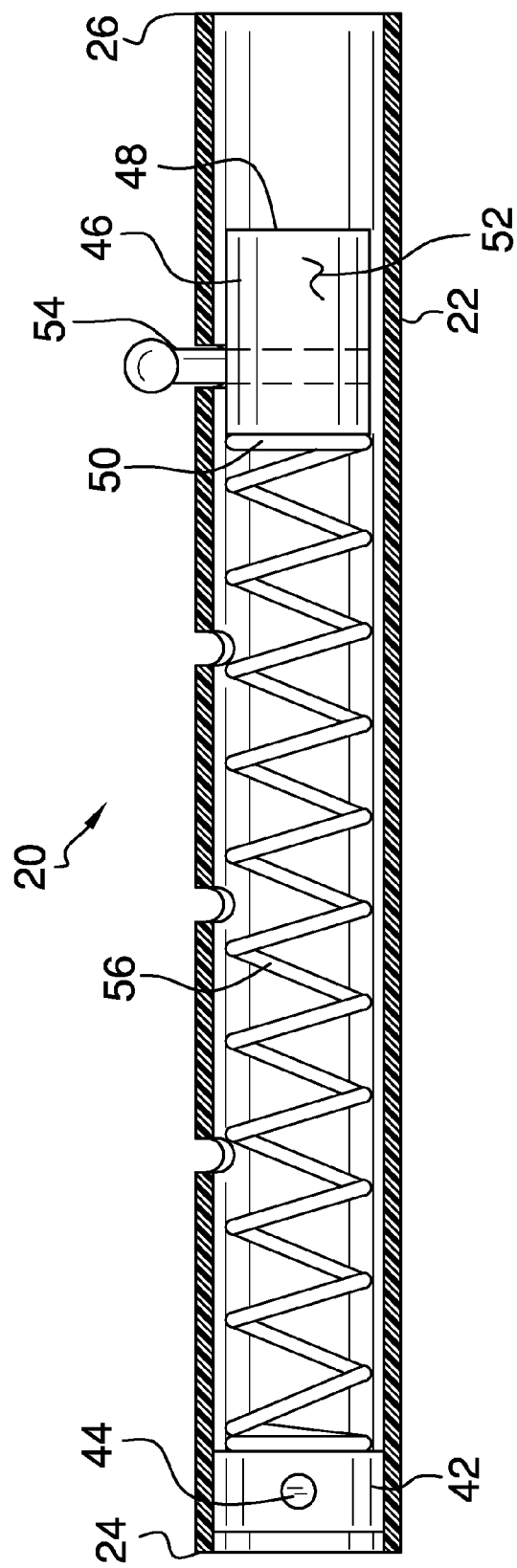
FIG. 4 is a cross sectional view taken along line 4-4 of FIG. 1 of an embodiment of the disclosure.
Figure 5:
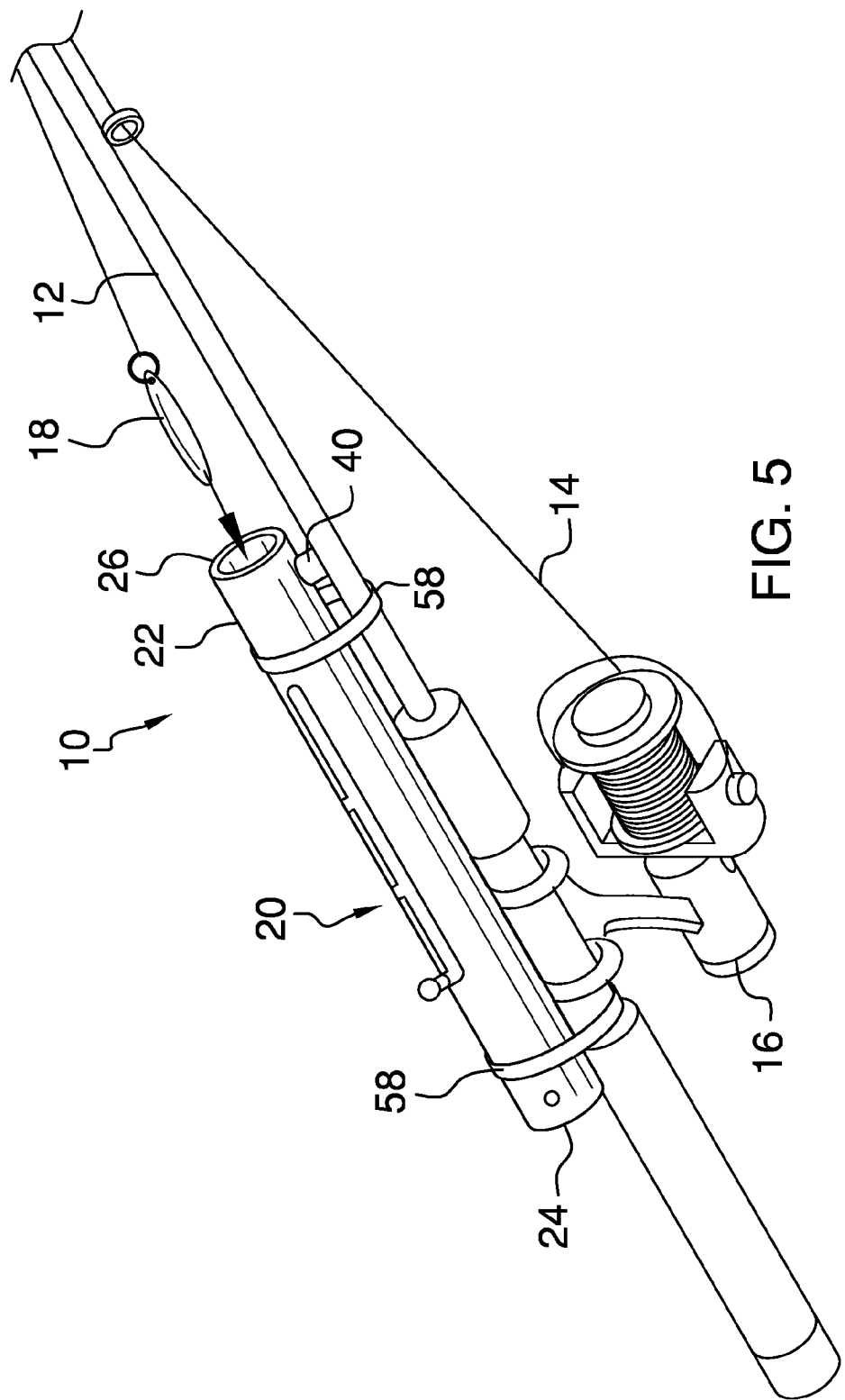
FIG. 5 is a perspective in-use view of an embodiment of the disclosure.

With reference now to the drawings, and in particular to FIGS. 1 through 5 thereof, a new catapult device embodying the principles and concepts of an embodiment of the disclosure and generally designated by the reference numeral 10 will be described.

As best illustrated in FIGS. 1 through 5, the catapult system 10 generally comprises a fishing rod 12 that has a line 14 and a reel 16. The line 14 has a lure 18 that is coupled thereto such that the lure 18 may be cast from the fishing rod 12. The fishing rod 12 may be a fishing rod of any conventional design. A catapult 20 is removably coupled to the fishing rod 12. The catapult 20 engages the lure 18 such that the catapult 20 selectively casts the lure 18 outwardly from the fishing rod 12. Thus, the catapult 20 facilitates a physically disabled user to cast the lure 18.

The catapult 20 comprises a tube 22 has a first end 24, a second end 26 and an outer wall 28. The outer wall 28 has an outer surface 30 and an inner surface 32. The lure 18 is insertable into the second end 26. The tube 22 has a first slot 34 extending through the inner surface 32 and the outer surface 30. The first slot 34 extends substantially between the first end 24 and the second end 26 and the first slot 34 has a first bounding edge 36.

The tube 22 has a plurality of second slots 38 extending through the inner surface 32 and the outer surface 30. Each of the plurality of second slots 38 intersects the first slot 34. Each of the plurality of second slots 38 is oriented perpendicular to the first slot 34. Each of the second slots 38 is spaced apart from each other and is distributed along the first bounding edge 36.

A bumper 40 is coupled to and extends outwardly away from the outer surface 30. The bumper 40 is positioned adjacent to the second end 26. The tube 22 is positioned on the fishing rod 12 having the bumper 40 abutting the fishing rod 12. Thus, the tube 22 angles outwardly between the first end 24 and the second end 26 with respect to the fishing rod 12. The tube 22 is positioned proximate the reel 16.

A stop 42 is removably positioned within the first end 24. Thus, the stop 42 closes the first end 24. A pin 44 removably extends through the outer wall 28 of the tube 22 and engages the stop 42. Thus, the stop 42 is removably retained within the first end 24.

A slide 46 is provided that has a front end 48, a back end 50 and an exterior surface 52 extending between the front end 48 and the back end 50. The exterior surface 52 is curved such that the slide 46 has a cylindrical shape. The slide 46 is slidably positioned within the tube 22. The exterior surface 52 slides against the inner surface 32 of the tube 22.

A handle 54 is provided and the handle extends away from the exterior surface 52. The handle 54 extends outwardly through the first slot 34 such that the handle 54 may be manipulated. The handle 54 is slidable along the first slot 34 such that the slide 46 is positionable at a selected point within the tube 22. The handle 54 is positionable in a selected one of the second slots 38 such that the slide 46 is retained at the selected point within the tube 22. The handle 54 may extend through the slide 46.

A biasing member 56 is positioned within the tube 22 and the biasing member 56 extends between the back end 50 of the slide 46 and the stop 42. The biasing member 56 is compressed between the slide 46 and the stop 42 when the handle 54 is urged toward the first end 24 of the tube 22. Thus, the biasing member 56 biases the slide 46 toward the second end 26. The biasing member 56 may be a spring biasing member or the like. The biasing member 56 is inhibited from urging the slide 46 toward the second end 26 when the handle 54 is positioned within the selected second slot 38. The biasing member 56 urges the slide 46 toward the second end 26 when the handle 54 is released from the selected second slot 38. Thus, the front end 48 slide 46 casts the lure 18 outwardly from the second end 26.

A pair of couplers 58 is provided and each of the couplers 58 extends around the outer wall 28 of the tube 22 and the fishing rod 12. Each of the couplers 58 removably retains the tube 22 on the fishing rod 12. Each of the couplers 58 is positioned proximate an associated one of the first end 24 and the second end 26 of the tube 22. Each of the couplers 58 may comprise a hose clamp or the like.

In use, the handle 54 is manipulated rearwardly along the first slot 34 and the handle 54 is positioned into a selected one of the second slots 38. The slide 46 compresses the biasing member 56 to a greater degree as the handle 54 is moved closer to the first end 24 of the tube 22. Thus, a casting force generated by the biasing member 56 is selected between a minimum casting force and a maximum casting force. The lure 18 is inserted into the second end 26 of the tube 22. The fishing rod 12 is manipulated to direct the lure 18 in a selected direction. The handle 54 is manipulated to release the handle 54 from the selected second slot 38. Thus, the biasing member 56 urges the slide 46 toward the first end 24 and the lure 18 is casted in the selected direction.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A catapult system comprising:
   a fishing rod having a line and a reel, said line having a lure being coupled thereto such that said lure may be cast outwardly from said fishing rod, said fishing rod having a pole and a grip, said grip being coupled to said pole adjacent to said reel, an outer diameter of said grip being greater than an outer diameter of said pole extending from said grip;
   a catapult being removably coupled to said fishing rod, said catapult engaging said lure such that said catapult selectively casts said lure outwardly from said fishing rod, said catapult comprising a tube having a first end, a second end and an outer wall, said outer wall having an outer surface and an inner surface, said lure being insertable into said second end; and
   a bumper being coupled to and extending outwardly away from said outer surface, said bumper being positioned on said fishing rod spaced from a middle of said tube and adjacent to said second end of said tube wherein said tube is couplable to said fishing rod such that said bumper abuts said pole of said fishing rod and said first end of said tube abuts said grip such that said tube angles outwardly between said first end and said second end with respect to said fishing rod.

2. The system according to claim 1, wherein said tube has a first slot extending through said inner surface and said outer surface, said first slot extending substantially between said first end and said second end, said first slot having a first bounding edge.

3. The system according to claim 2, wherein said tube has a plurality of second slots extending through said inner surface and said outer surface, each of said plurality of second slots intersecting said first slot, each of said plurality of second slots being oriented perpendicular to said first slot, each of said second slots being spaced apart from each other and being distributed along said first bounding edge.

4. The system according to claim 1, further comprising a stop being removably positioned within said first end such that said stop closes said first end.

5. The system according to claim 4, further comprising a pin removably extending through said outer wall of said tube and engaging said stop such that said stop is removably retained within said first end.

6. The system according to claim 1, further comprising a slide having a front end, a back end and an exterior surface extending between said front end and said back end, said exterior surface being curved such that said slide has a cylindrical shape, said slide being slidably positioned within said tube such that said exterior surface slides against said inner surface of said tube.

7. The system according to claim 6, further comprising:
   said tube having a first slot; and
   a handle being coupled to and extending away from said exterior surface, said handle extending outwardly through said first slot wherein said handle is configured to be manipulated.

8. The system according to claim 7, wherein:
   said tube has a plurality of second slots; and
   said handle is slidable along said first slot such that said slide is positionable at a selected point within said tube, said handle being positionable in a selected one of said second slots such that said slide is retained at said selected point within said tube.

9. The system according to claim 6, further comprising:
   a stop; and
   a biasing member being positioned within said tube, said biasing member extending between said back end of said slide and said stop, said biasing member being compressed between said slide and said stop when said handle is urged toward said first end of said tube such that said biasing member biases said slide toward said second end.

10. The system according to claim 9, wherein:
    said tube has a plurality of second slots; and
    said biasing member is inhibited from urging said slide toward said second end when said handle is positioned within said selected second slot, said biasing member urging said slide toward said second end when said handle is released from said selected second slot such that said slide casts said lure outwardly from said second end.

11. The system according to claim 1, further comprising a pair of couplers, each of said couplers extending around said outer wall of said tube and said fishing rod such that each of said couplers removably retains said tube on said fishing rod.

12. A catapult system comprising:
    a fishing rod having a line and a reel, said line having a lure being coupled thereto such that said lure is cast outwardly from said fishing rod, said fishing rod having a pole and a grip, said grip being coupled to said pole adjacent to said reel, an outer diameter of said grip being greater than an outer diameter of said pole extending from said grip; and
    a catapult being removably coupled to said fishing rod, said catapult engaging said lure such that said catapult selectively launches said lure outwardly from said fishing rod, said catapult comprising:
    a tube having a first end, a second end and an outer wall, said outer wall having an outer surface and an inner surface, said lure being insertable into said second end, said tube having a first slot extending through said inner surface and said outer surface, said first slot extending substantially between said first end and said second end, said first slot having a first bounding edge, said tube having a plurality of second slots extending through said inner surface and said outer surface, each of said plurality of second slots intersecting said first slot, each of said plurality of second slots being oriented perpendicular to said first slot, each of said second slots being spaced apart from each other and being distributed along said first bounding edge, a bumper being coupled to and extending outwardly away from said outer surface, said bumper being positioned on said fishing rod spaced from a middle of said tube and adjacent to said second end of said tube wherein said tube is couplable to said fishing rod such that said bumper abuts said pole of said fishing rod and said first end of said tube abuts said grip such that said tube angles outwardly between said first end and said second end with respect to said fishing rod, a stop being removably positioned within said first end such that said stop closes said first end, a pin removably extending through said outer wall of said tube and engaging said stop such that said stop is removably retained within said first end, a slide having a front end, a back end and an exterior surface extending between said front end and said back end, said exterior surface being curved such that said slide has a cylindrical shape, said slide being slidably positioned within said tube such that said exterior surface slides against said inner surface of said tube, a handle being coupled to and extending away from said exterior surface, said handle extending outwardly through said first slot wherein said handle is configured to be manipulated, said handle being slidable along said first slot such that said slide is positionable at a selected point within said tube, said handle being positionable in a selected one of said second slots such that said slide is retained at said selected point within said tube, a biasing member being positioned within said tube, said biasing member extending between said back end of said slide and said stop, said biasing member being compressed between said slide and said stop when said handle is urged toward said first end of said tube such that said biasing member biases said slide toward said second end, said biasing member being inhibited from urging said slide toward said second end when said handle is positioned within said selected second slot, said biasing member urging said slide toward said second end when said handle is released from said selected second slot such that said slide casts said lure outwardly from said second end, and a pair of couplers, each of said couplers extending around said outer wall of said tube and said fishing rod such that each of said couplers removably retains said tube on said fishing rod.

* * * * *